(12) United States Patent
MolavianJazi et al.

(10) Patent No.: US 12,501,298 B2
(45) Date of Patent: Dec. 16, 2025

(54) ASSISTANCE INFORMATION FROM REPEATER

(71) Applicant: Samsung Electronics Co., Ltd., Suwon-si (KR)

(72) Inventors: Ebrahim MolavianJazi, San Jose, CA (US); Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 18/174,325

(22) Filed: Feb. 24, 2023

(65) Prior Publication Data

US 2024/0022931 A1 Jan. 18, 2024

Related U.S. Application Data

(60) Provisional application No. 63/317,911, filed on Mar. 8, 2022.

(51) Int. Cl.
*H04W 24/08* (2009.01)
*H04W 16/26* (2009.01)

(52) U.S. Cl.
CPC ........... *H04W 24/08* (2013.01); *H04W 16/26* (2013.01)

(58) Field of Classification Search
CPC ..... H04W 24/08; H04W 16/26; H04W 24/10; H04W 84/047; H04W 88/04; H04W 56/001; H04W 72/1268; H04W 72/21; H04W 72/23; H04L 5/0048; H04L 5/0057; H04L 1/0023; H04B 7/155; H04B 7/15528; H04B 17/328
See application file for complete search history.

(56) References Cited

U.S. PATENT DOCUMENTS

| | | | |
|---|---|---|---|
| 9,215,686 B2 | 12/2015 | Kazmi et al. | |
| 2012/0140652 A1 | 6/2012 | Pan et al. | |
| 2020/0053624 A1* | 2/2020 | Braithwaite | ........ H04W 84/047 |
| 2021/0051679 A1* | 2/2021 | Abedini | ............. H04W 72/044 |

(Continued)

OTHER PUBLICATIONS

International Search Report and Written Opinion issued Jun. 23, 2023, regarding International Application No. PCT/KR2023/003196, 10 pages.

(Continued)

*Primary Examiner* — Afshawn M Towfighi

(57) ABSTRACT

Apparatuses and methods for assistance information from repeaters. A method for a network-controlled repeater (NCR) includes receiving, by an NCR mobile termination (NCR-MT) entity first information for reception parameters of a set of uplink (UL) signals or channels and second information for reporting a metric corresponding to the set of UL signals or channels and receiving, on an access link of an NCR forwarding (NCR-Fwd) entity, based on the first information, an UL signal or channel from the set of UL signals or channels. The method further includes determining, by the NCR-MT entity a measurement for the UL signal or channel and a value for the metric based on the measurement and transmitting, by the NCR-MT entity, a physical uplink shared channel (PUSCH) or a physical uplink control channel (PUCCH) that provides the value.

20 Claims, 8 Drawing Sheets

(56) References Cited

U.S. PATENT DOCUMENTS

| | | | |
|---|---|---|---|
| 2021/0328643 A1* | 10/2021 | Damnjanovic | H04L 1/0003 |
| 2022/0053433 A1 | 2/2022 | Abedini et al. | |
| 2022/0069868 A1 | 3/2022 | Abedini et al. | |
| 2023/0097862 A1* | 3/2023 | Horn | G01S 13/765 |
| | | | 455/456.1 |
| 2024/0057110 A1* | 2/2024 | Babaei | H04W 72/232 |

OTHER PUBLICATIONS

ZTE Corporation, "New SI: Study on NR Network-controlled Repeaters", 3GPP TSG RAN Meeting #94e, RP-213700, Dec. 2021, 4 pages.

Nokia et al., "Reference points and regional requirements for NR repeaters", 3GPP TSG-RAN WG4 Meeting #101-bis-e, R4-2201657, Jan. 2022, 4 pages.

Extended European Search Report issued Apr. 9, 2025 regarding Application No. 23767174.8, 12 pages.

CATT, "CR on SRS RSRP measurement report mapping", 3GPP RAN WG4 Meeting #95-e, R4-2006241, May 2020, 2 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"5G; NR; Medium Access Control (MAC) protocol specification (3GPP TS 38.321 version 16.7.0 Release 16)", ETSI TS 138 321 V16.7.0, Jan. 2022, 160 pages.

"5G; NR; Radio Resource Control (RRC); Protocol specification (3GPP TS 38.331 version 16.7.0 Release 16)", ETSI TS 138 331 V16.7.0, Jan. 2022, 950 pages.

"5G; NR; NR and NG-RAN Overall description; Stage-2 (3GPP TS 38.300 version 16.8.0 Release 16)", ETSI TS 138 300 V16.8.0, Jan. 2022, 155 pages.

* cited by examiner

ASSISTANCE INFORMATION FROM REPEATER

CROSS-REFERENCE TO RELATED APPLICATION AND CLAIM OF PRIORITY

This application claims priority under 35 U.S.C. § 119(e) to U.S. Provisional Patent Application No. 63/317,911 filed on Mar. 8, 2022. The above-identified provisional patent application is hereby incorporated by reference in its entirety.

TECHNICAL FIELD

The present disclosure relates generally to wireless communication systems and, more specifically, to assistance information from repeaters.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for assistance information from repeaters.

In one embodiment, a method for a network-controlled repeater (NCR) is provided. The method includes receiving, by an NCR mobile termination (NCR-MT) entity first information for reception parameters of a set of uplink (UL) signals or channels and second information for reporting a metric corresponding to the set of UL signals or channels and receiving, on an access link of an NCR forwarding (NCR-Fwd) entity, based on the first information, an UL signal or channel from the set of UL signals or channels. The method further includes determining, by the NCR-MT entity a measurement for the UL signal or channel and a value for the metric based on the measurement and transmitting, by the NCR-MT entity, a physical uplink shared channel (PUSCH) or a physical uplink control channel (PUCCH) that provides the value.

In another embodiment, an NCR is provided. The NCR includes a transceiver of an NCR-MT entity configured to receive first information for reception parameters of a set of UL signals or channels and second information for reporting a metric corresponding to the set of UL signals or channels. The NCR further includes a transceiver of an NCR-Fwd entity configured to receive, on an access link and based on the first information, an UL signal or channel from the set of UL signals or channels. The NCR further includes a processor of the NCR-MT entity, operably coupled to the transceiver of the NCR-MT entity and the transceiver of the NCR-Fwd entity, the processor of the NCR-MT entity configured to determine a measurement for the UL signal or channel and a value for the metric based on the measurement. The transceiver of the NCR-MT entity is further configured to transmit a PUSCH or a PUCCH that provides the value.

In yet another embodiment, a base station is provided. The base station includes a transceiver configured to transmit, to an NCR, first information for reception parameters of a set of UL signals or channels; transmit, to the NCR, second information for reporting a metric corresponding to the set of UL signals or channels; and receive, from the NCR, a PUSCH or a PUCCH that provides a value for the metric based on a measurement of an UL signal or channel, from the set of UL signals or channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
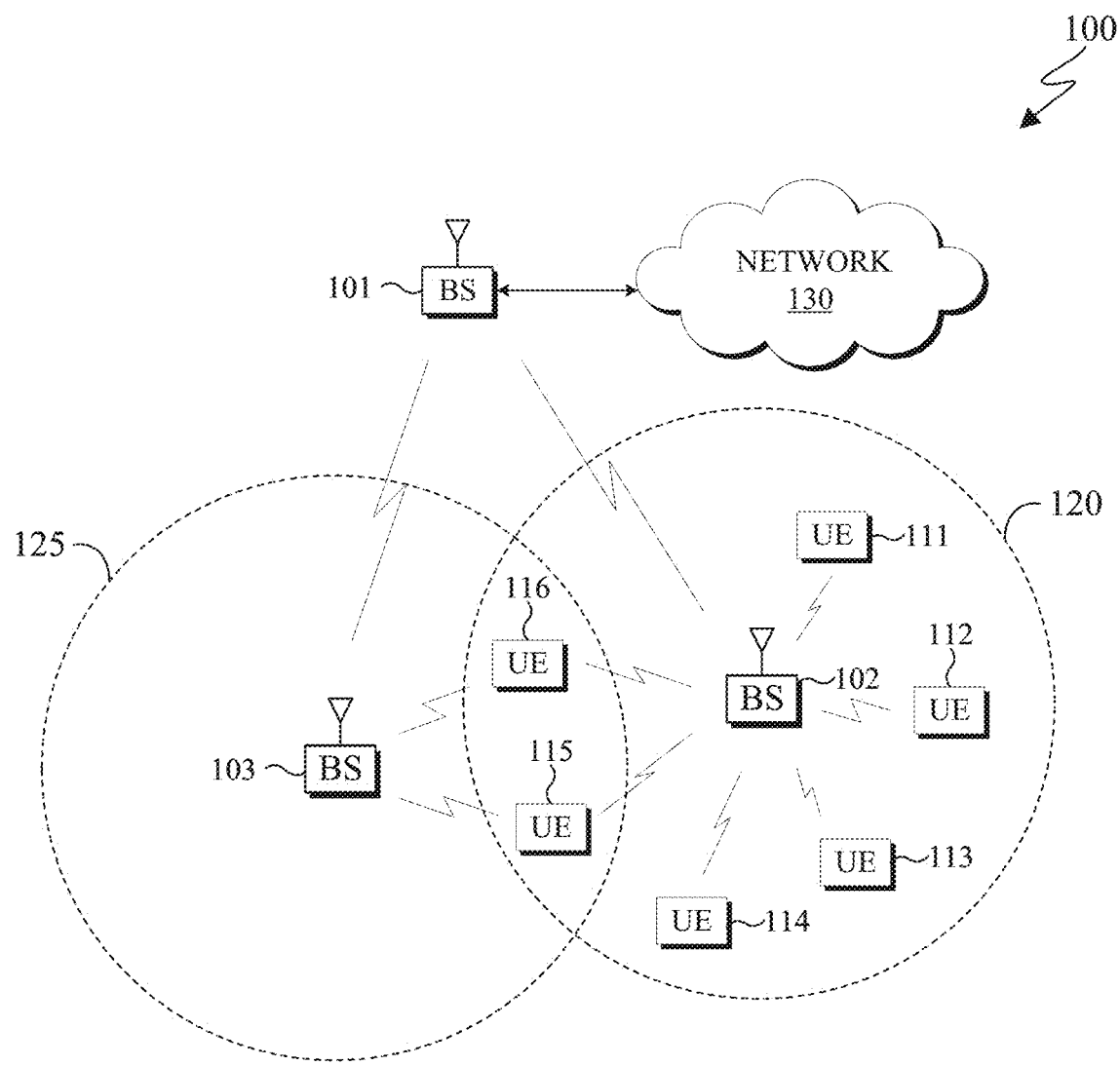
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical Channels and Modulation" (herein "REF 1"); 3GPP TS 38.212 v17.0.0, "NR, Multiplexing and channel coding" (herein "REF 2"); 3GPP TS 38.213 v17.0.0, "NR, Physical Layer Procedures for Control" (herein "REF 3"); 3GPP TS 38.214 v17.0.0; "NR, Physical Layer Procedures for Data" (herein "REF 4"); 3GPP TS 38.215 v17.0.0; "NR, Physical Layer Measurements" (herein "REF 5"); 3GPP TS 38.321 v16.7.0; "NR, Medium Access Control (MAC) Protocol Specification" (herein "REF 6"); 3GPP TS 38.331 v16.7.0; "NR, Radio Resource Control (RRC) Protocol Specification" (herein "REF 7"); and 3GPP TS 38.300 Rel-16 v16.8.0, "NR; NR and NG-RAN Overall Description; Stage 2" (herein "REF 8").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Various operations by a repeater, such as a smart repeater (SR), also known as a network-controlled (NetCon) repeater (NCR), such as for beam selection, application of UL-DL TDD configuration, ON/OFF operation, and so on, are based on the assumption that the gNB can determine whether/which UE(s) are served by the gNB through the NCR. For continued operation of the network, including for NCR operation as well as for UE configuration and scheduling, the gNB needs to be able to determine whether a UE is within a coverage area of the NCR or whether UE(s) have moved in or out of the NCR coverage area. Such behavior applies to UE operation during initial access, as well as UE operation after RRC connection.

However, at least part of such determination is based on 'local' measurements by the NCR of channel/radio quantities on the NCR-to-UE link that are not directly available or 'visible' to the gNB. Of course, such measurements would require sharing some level of UE-specific information with the NCR.

Various embodiments of the present disclosure recognize that there is a need for the UE and the gNB to coordinate on the UE-specific configuration information, and exchange of local measurements by the NCR of the NCR-to-UE link. Accordingly, various embodiments of the present disclosure provide methods and apparatus for mobility management for UEs in the presence of smart repeaters (SR), also known as network-controlled repeaters (NCR).

In general, the embodiments apply to any deployments, verticals, or scenarios including FR1, FR2 or in FR1+FR2, with eMBB, URLLC and IIoT and extended reality (XR), mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, multi-cast broadcast services (MBS), and so on.

Figure 2:
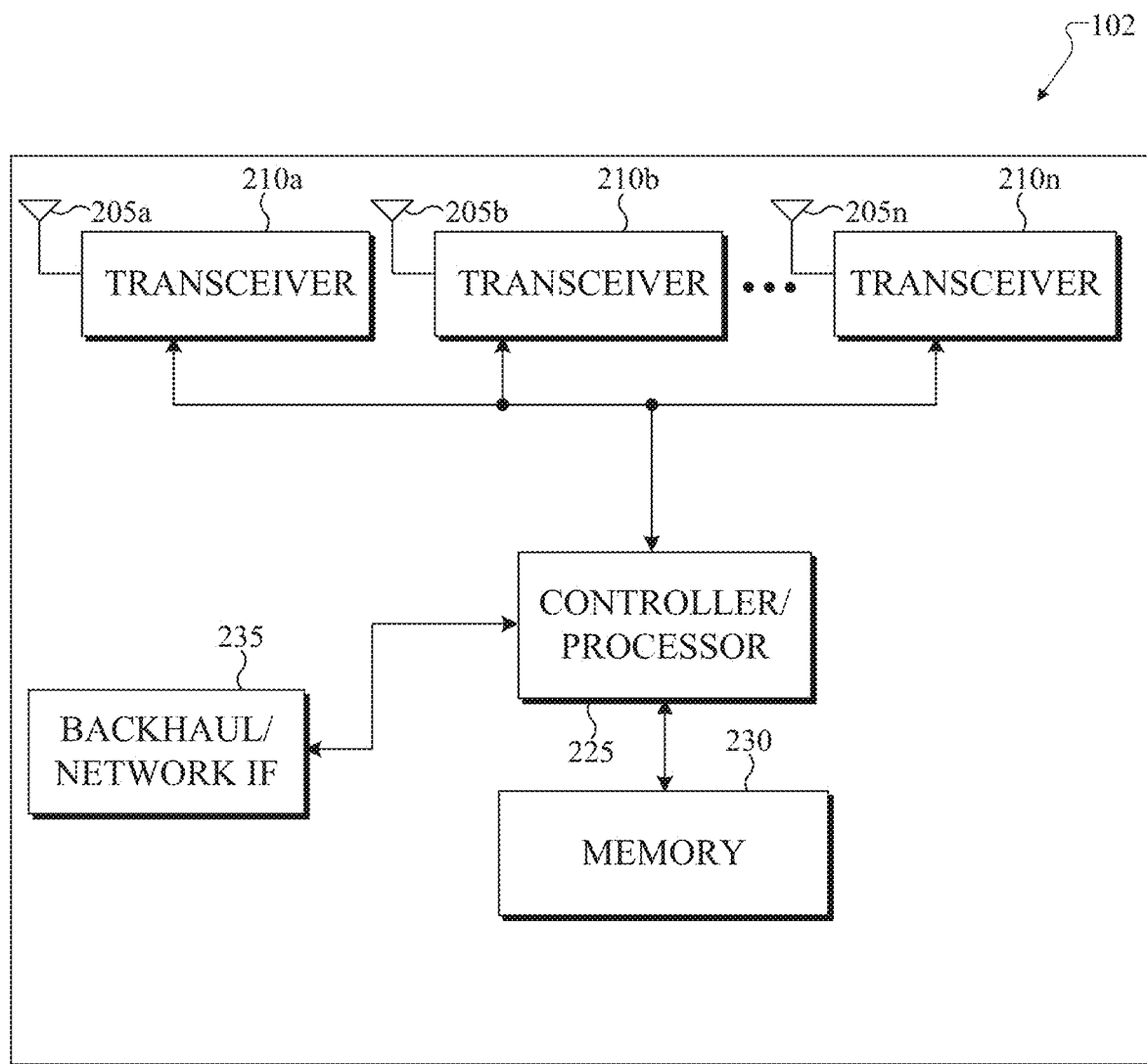
FIG. 2 illustrates an example gNodeB (gNB) according to embodiments of the present disclosure.
Figure 3:
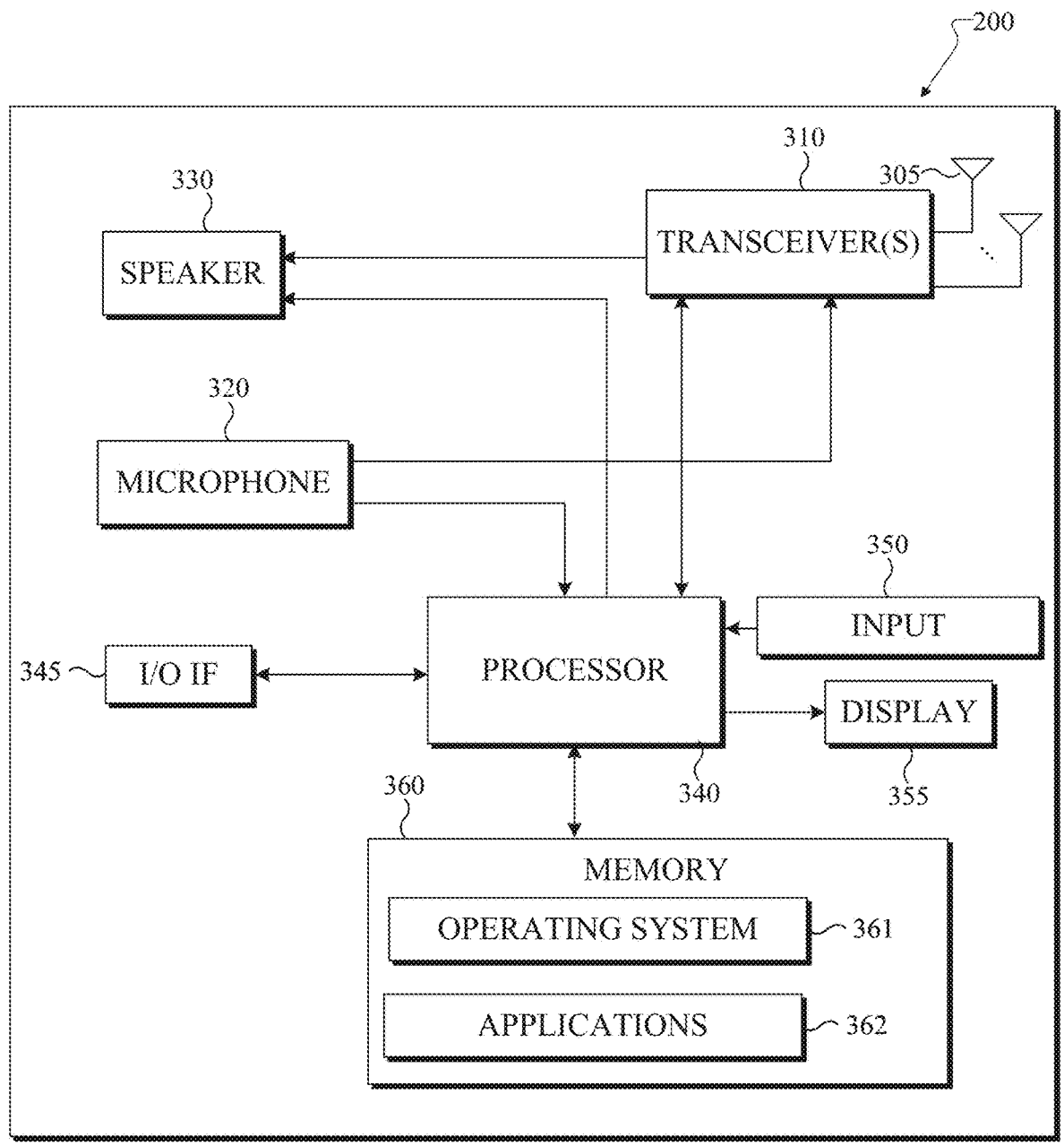
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting mobility management for presence of repeater. In certain embodiments, one or more of the BSs 101-103 include circuitry, programing, or a combination thereof for supporting mobility management for presence of repeaters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example TRP 200 according to embodiments of the present disclosure. The embodiment of the TRP 200 illustrated in FIG. 2 is for illustration only. In various embodiments, the TRP 200 is a base station such as gNBs 101-103 of FIG. 1. In other embodiments, the TRP 200 may be a repeater, such as a network controlled repeater (NCR). TRPs come in a wide variety of configurations, and FIG. 2 does not limit the scope of this disclosure to any particular implementation of a TRP.

As shown in FIG. 2, the TRP 200 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs or gNBs in the network 100. In various embodiments, certain of the transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals. For example, in embodiments where the TRP 200 is a repeater, one or more of the transceivers 210 may be used for an NCR radio unit (NCR-RU) entity or NCR forwarding (NCR-Fwd) entity as a DL connection for signaling over an NCR access link with a UE and/or over a backhaul link with a gNB. In these examples, the associated one(s) of the transceivers 210 for the NCR-RU entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP is a repeater, one or more of the transceivers 210 may be used for an NCR mobile termination (NCR-MT) entity as a DL or UL connection for control signaling over an NCR control link (C-link) with a gNB.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the TRP 200. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for facilitating beam management for repeaters. Any of a wide variety of other functions could be supported in the TRP 200 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP 200 is a repeater, the interface 235 may be used for an NCR-RU or NCR-Fwd entity as a backhaul connection with a gNB over a backhaul link (or NCR forward link) for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Throughout the present disclosure, the term "configuration" or "higher layer configuration" and variations thereof (such as "configured" and so on) are used to refer to one or more of: a system information signaling such as by a MIB or a SIB (such as SIB1), a common or cell-specific higher layer/RRC signaling, or a dedicated or UE-specific or BWP-specific higher layer/RRC signaling, or a pre-configuration based on other-the-air (OTA) signaling or using other implementation-based or offline methods, such as operation and management (OAM), and so on.

Throughout the present disclosure, the term signal quality is used to refer to e.g., RSRP or RSRQ or RSSI or SNR or SINR, with or without filtering such as L1 or L3 filtering, of a channel or a signal such as a reference signal (RS) including SSB, CSI-RS, or SRS.

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

Polar coding is used for PBCH. The UE may assume a band-specific sub-carrier spacing for the SSB unless a network has configured the UE to assume a different sub-carrier spacing. PBCH symbols carry its own frequency-multiplexed DMRS. QPSK modulation is used for PBCH.

Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with an RMSI, the SSB is referred to as a Cell-Defining SSB (CD-SSB). A PCell is always associated to a CD-SSB located on the synchronization raster.

Cell selection is always based on CD-SSBs located on the synchronization raster. The UE searches the NR frequency bands and for each carrier frequency identifies the strongest cell as per the CD-SSB. It then reads cell system information broadcast to identify its PLMN(s). The UE may search each carrier in turn ("initial cell selection") or make use of stored information to shorten the search ("stored information cell selection"). Cell reselection is always based on CD-SSBs located on the synchronization raster.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DM-RS ports associated with a PDSCH are QCL with QCL Type A, Type D (when applicable) and average gain. The UE may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}
'QCL-TypeD': {Spatial Rx parameter}

The UE receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

Network controlled mobility applies to UEs in RRC_CONNECTED and is categorized into two types of mobility: cell level mobility and beam level mobility.

Cell Level Mobility requires explicit RRC signaling to be triggered, i.e., handover. For inter-gNB handover, the signaling procedures include at least the following elemental components:

1. The source gNB initiates handover and issues a HANDOVER REQUEST over the Xn interface.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete.

Note 1: User Data can also be sent in step 4 if the grant allows.

In case of DAPS handover, the UE continues the downlink user data reception from the source gNB until releasing the source cell and continues the uplink user data transmission to the source gNB until successful random access procedure to the target gNB.

Only the source and target PCell are used during DAPS handover. CA, DC, SUL, multi-TRP, EHC, CHO, NR sidelink configurations and V2X sidelink configurations are released by the source gNB before the handover command is sent to the UE and are not configured by the target gNB until the DAPS handover has completed (i.e., at earliest in the same message that releases the source PCell).

The handover mechanism triggered by RRC requires the UE at least to reset the MAC entity and re-establish RLC, except for DAPS handover, where upon reception of the handover command, the UE:

Creates a MAC entity for target;
Establishes the RLC entity and an associated DTCH logical channel for target for each DRB configured with DAPS;
For each DRB configured with DAPS, reconfigures the PDCP entity with separate security and ROHC functions for source and target and associates them with the RLC entities configured by source and target respectively;

Retains the rest of the source configurations until release of the source.

RRC managed handovers with and without PDCP entity re-establishment are both supported. For DRBs using RLC AM mode, PDCP can either be re-established together with a security key change or initiate a data recovery procedure without a key change. For DRBs using RLC UM mode, PDCP can either be re-established together with a security key change or remain as it is without a key change. For SRBs, PDCP can either remain as it is, discard its stored PDCP PDUs/SDUs without a key change or be re-established together with a security key change.

Data forwarding, in-sequence delivery and duplication avoidance at handover can be guaranteed when the target gNB uses the same DRB configuration as the source gNB.

Timer based handover failure procedure is supported in NR. An RRC connection re-establishment procedure is used for recovering from handover failure except in certain CHO or DAPS handover scenarios:

When DAPS handover fails, the UE falls back to the source cell configuration, resumes the connection with the source cell, and reports DAPS handover failure via the source without triggering RRC connection re-establishment if the source link has not been released.

When initial CHO execution attempt fails or HO fails, the UE performs cell selection, and if the selected cell is a CHO candidate and if network configured the UE to try CHO after handover/CHO failure, then the UE attempts CHO execution once, otherwise re-establishment is performed.

DAPS handover for FR2 to FR2 case is not supported in this release of the specification.

The handover of the IAB-MT in SA mode follows the same procedure as described for the UE. After the backhaul has been established, the handover of the IAB-MT is part of the intra-CU topology adaptation procedure defined in TS 38.401. Modifications to the configuration of BAP sublayer and higher protocol layers above the BAP sublayer are described in TS 38.401.

Beam Level Mobility does not require explicit RRC signaling to be triggered. The gNB provides via RRC signaling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signaling, and RRC is not required to know which beam is being used at a given point in time.

SSB-based Beam Level Mobility is based on the SSB associated to the initial DL BWP and can only be configured for the initial DL BWPs and for DL BWPs containing the SSB associated to the initial DL BWP. For other DL BWPs, Beam Level Mobility can only be performed based on CSI-RS.

In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

Figure 4:
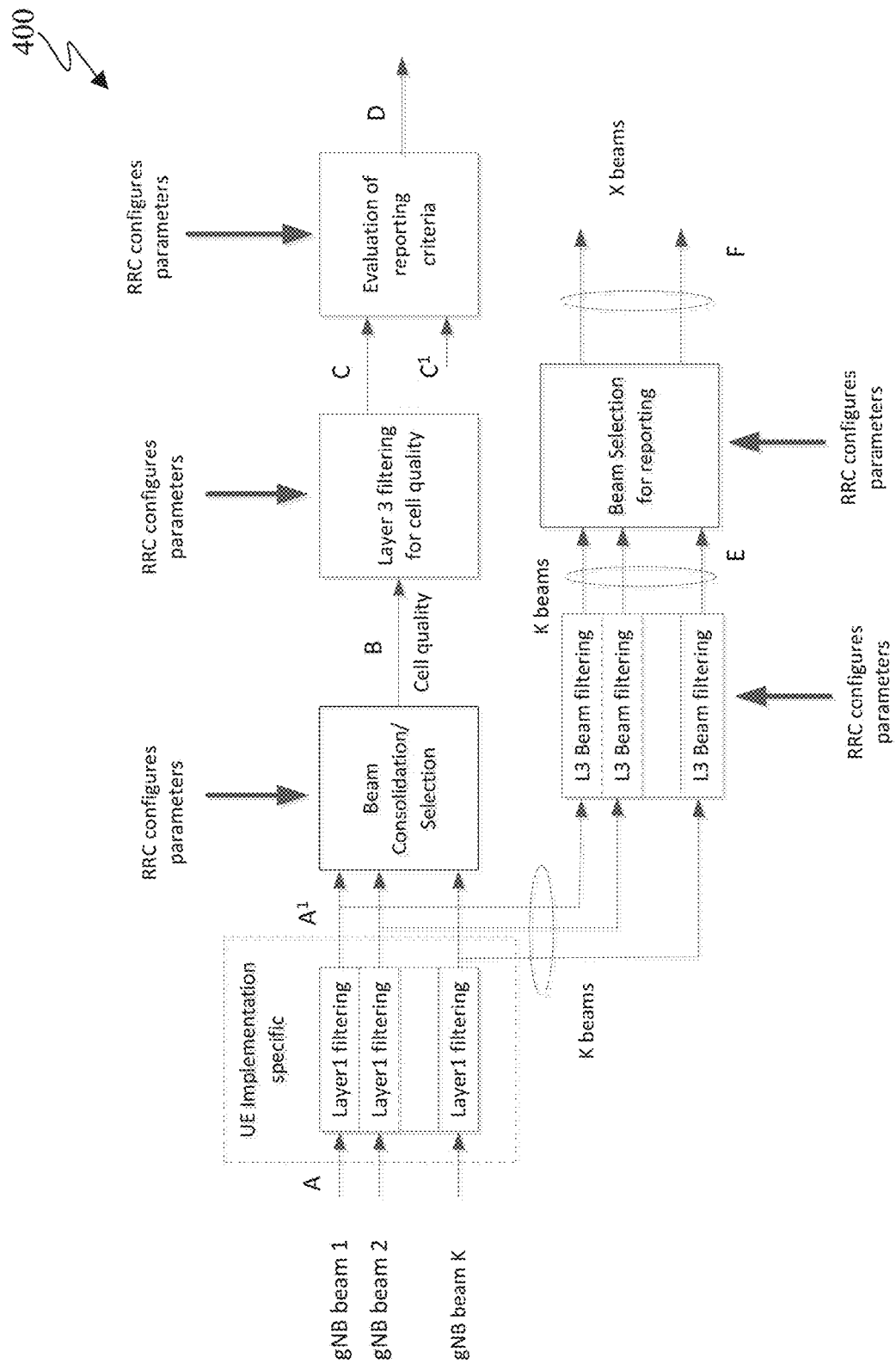
FIG. 4 illustrates an example measurement model according to embodiments of the present disclosure.

FIG. 4 illustrates an example measurement model 400 according to embodiments of the present disclosure. The embodiment of the measurement model 400 illustrated in FIG. 4 is for illustration only. FIG. 4 does not limit the scope of this disclosure to any particular implementation of the measurement model 400.

As illustrated in FIG. 4:

K beams correspond to the measurements on SSB or CSI-RS resources configured for L3 mobility by gNB and detected by UE at L1.

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) is not constrained by the standard.

$A^1$: measurements (i.e., beam specific measurements) reported by layer 1 to layer 3 after layer 1 filtering.

Beam Consolidation/Selection: beam specific measurements are consolidated to derive cell quality. The behavior of the Beam consolidation/selection is standardized, and the configuration of this module is provided by RRC signaling. Reporting period at B equals one measurement period at $A^1$.

B: a measurement (i.e., cell quality) derived from beam-specific measurements reported to layer 3 after beam consolidation/selection.

Layer 3 filtering for cell quality: filtering performed on the measurements provided at point B. The behavior of the Layer 3 filters is standardized, and the configuration of the layer 3 filters is provided by RRC signaling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g., to compare between different measurements. This is illustrated by input C and $C^1$. The UE shall evaluate the reporting criteria at least every time a new measurement result is reported at point C, $C^1$. The reporting criteria are standardized, and the configuration is provided by RRC signaling (UE measurements).

D: measurement report information (message) sent on the radio interface.

L3 Beam filtering: filtering performed on the measurements (i.e., beam specific measurements) provided at point $A^1$. The behavior of the beam filters is standardized, and the configuration of the beam filters is provided by RRC signaling. Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting the X measurements to be reported.

Beam Selection for beam reporting selects the X measurements from the measurements provided at point E. The behavior of the beam selection is standardized, and the configuration of this module is provided by RRC signaling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in TS 38.133. Layer 3 filtering for cell quality and related parameters used are specified in TS 38.331 and do not introduce any delay in the sample availability between B and C. Measurement at point C, $C^1$ is the input used in the event evaluation. L3 Beam filtering and related parameters used are specified in TS 38.331 and do not introduce any delay in the sample availability between E and F.

Measurement reports are characterized by the following:

Measurement reports include the measurement identity of the associated measurement configuration that triggered the reporting;

Cell and beam measurement quantities to be included in measurement reports are configured by the network;

The number of non-serving cells to be reported can be limited through configuration by the network;

Cells belonging to a blacklist configured by the network are not used in event evaluation and reporting, and conversely when a whitelist is configured by the network, only the cells belonging to the whitelist are used in event evaluation and reporting;

Beam measurements to be included in measurement reports are configured by the network (beam identifier only, measurement result and beam identifier, or no beam reporting).

Intra-frequency neighbor (cell) measurements and inter-frequency neighbor (cell) measurements are defined as follows:

SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs is also the same.

SSB based inter-frequency measurement: a measurement is defined as an SSB based inter-frequency measurement provided the center frequency of the SSB of the serving cell and the center frequency of the SSB of the neighbor cell are different, or the subcarrier spacing of the two SSBs is different.

NOTE 2: For SSB based measurements, one measurement object corresponds to one SSB and the UE considers different SSBs as different cells.

CSI-RS based intra-frequency measurement: a measurement is defined as a CSI-RS based intra-frequency measurement provided that:

The subcarrier spacing of CSI-RS resources on the neighbor cell configured for measurement is the same as the SCS of CSI-RS resources on the serving cell indicated for measurement; and For 60 kHz subcarrier spacing, the CP type of CSI-RS resources on the neighbor cell configured for measurement is the same as the CP type of CSI-RS resources on the serving cell indicated for measurement; and The center frequency of CSI-RS resources on the neighbor cell configured for measurement is the same as the center frequency of CSI-RS resource on the serving cell indicated for measurement.

CSI-RS based inter-frequency measurement: a measurement is defined as a CSI-RS based inter-frequency measurement if it is not a CSI-RS based intra-frequency measurement.

NOTE 3: Extended CP for CSI-RS based measurement is not supported in this release.

Whether a measurement is non-gap-assisted or gap-assisted depends on the capability of the UE, the active BWP of the UE and the current operating frequency:

For SSB based inter-frequency measurement, if the measurement gap requirement information is reported by the UE, a measurement gap configuration may be provided according to the information. Otherwise, a measurement gap configuration is always provided in the following cases:

If the UE only supports per-UE measurement gaps;

If the UE supports per-FR measurement gaps and any of the serving cells are in the same frequency range of the measurement object.

For SSB based intra-frequency measurement, if the measurement gap requirement information is reported by the UE, a measurement gap configuration may be provided according to the information. Otherwise, a measurement gap configuration is always provided in the following case:

Other than the initial BWP, if any of the UE configured BWPs do not contain the frequency domain resources of the SSB associated to the initial DL BWP.

In non-gap-assisted scenarios, the UE shall be able to carry out such measurements without measurement gaps. In gap-assisted scenarios, the UE cannot be assumed to be able to carry out such measurements without measurement gaps.

The network may request the UE to measure NR and/or E-UTRA carriers in RRC_IDLE or RRC_INACTIVE via system information or via dedicated measurement configuration in RRCRelease. If the UE was configured to perform measurements of NR and/or E-UTRA carriers while in RRC_IDLE or in RRC_INACTIVE, it may provide an indication of the availability of corresponding measurement results to the gNB in the RRCSetupComplete message. The network may request the UE to report those measurements after security activation. The request for the measurements can be sent by the network immediately after transmitting the Security Mode Command (i.e., before the reception of the Security Mode Complete from the UE).

If the UE was configured to perform measurements of NR and/or E-UTRA carriers while in RRC_INACTIVE, the gNB can request the UE to provide corresponding measurement results in the RRCResume message and then the UE can include the available measurement results in the RRCResumeComplete message. Alternatively, the UE may provide an indication of the availability of the measurement results to the gNB in the RRCResumeComplete message and the gNB can then request the UE to provide these measurement results.

NR supports a beam failure detection and recovery procedure. For beam failure detection, the gNB configures the UE with beam failure detection reference signals (SSB or CSI-RS) and the UE declares beam failure when the number of beam failure instance indications from the physical layer reaches a configured threshold before a configured timer expires.

SSB-based Beam Failure Detection is based on the SSB associated to the initial DL BWP and can only be configured for the initial DL BWPs and for DL BWPs containing the SSB associated to the initial DL BWP. For other DL BWPs, Beam Failure Detection can only be performed based on CSI-RS.

After beam failure is detected on PCell, the UE:

triggers beam failure recovery by initiating a Random Access procedure on the PCell;

selects a suitable beam to perform beam failure recovery (if the gNB has provided dedicated Random Access resources for certain beams, those will be prioritized by the UE).

includes an indication of a beam failure on PCell in a BFR MAC CE if the Random Access procedure involves contention-based random access.

Upon completion of the Random Access procedure, beam failure recovery for PCell is considered complete.

After beam failure is detected on an SCell, the UE:

triggers beam failure recovery by initiating a transmission of a BFR MAC CE for this SCell;

selects a suitable beam for this SCell (if available) and indicates it along with the information about the beam failure in the BFR MAC CE.

Upon reception of a PDCCH indicating an uplink grant for a new transmission for the HARQ process used for the transmission of the BFR MAC CE, beam failure recovery for this SCell is considered complete.

NR supports Cross-Link Interference management. When different TDD DL/UL patterns are used between neighboring cells, UL transmission in one cell may interfere with DL reception in another cell: this is referred to as Cross Link Interference (CLI).

To mitigate CLI, gNBs can exchange and coordinate their intended TDD DL-UL configurations over Xn and F1 interfaces; and the victim UEs can be configured to perform CLI measurements. There are two types of CLI measurements:

SRS-RSRP measurement in which the UE measures SRS-RSRP over SRS resources of aggressor UE(s);

CLI-RSSI measurement in which the UE measures the total received power observed over RSSI resources.

Layer 3 filtering applies to CLI measurement results and both event triggered, and periodic reporting are supported.

The network may configure the UE to report the following CLI measurement information based on SRS resources:

Measurement results per SRS resource;

SRS resource(s) indexes.

The network may configure the UE to report the following CLI measurement information based on CLI-RSSI resources:

Measurement results per CLI-RSSI resource;

CLI-RSSI resource(s) indexes.

SRS reference signal received power (SRS-RSRP) is defined as linear average of the power contributions (in [W]) of the resource elements carrying sounding reference signals (SRS). SRS-RSRP shall be measured over the configured resource elements within the considered measurement frequency bandwidth in the configured measurement time occasions.

For frequency range 1, the reference point for the SRS-RSRP shall be the antenna connector of the UE. For frequency range 2, SRS-RSRP shall be measured based on the combined signal from antenna elements corresponding to a given receiver branch. For frequency range 1 and 2, if receiver diversity is in use by the UE, the reported SRS-RSRP value shall not be lower than the corresponding SRS-RSRP of any of the individual receiver branches.

CLI Received Signal Strength Indicator (CLI-RSSI), is defined as linear average of the total received power (in [W]) observed only in the configured OFDM symbols of the configured measurement time resource(s), in the configured measurement bandwidth from all sources, including co-channel serving and non-serving cells, adjacent channel interference, thermal noise etc.

For frequency range 1, the reference point for the RSSI shall be the antenna connector of the UE. For frequency range 2, CLI-RSSI shall be measured based on the combined signal from antenna elements corresponding to a given receiver branch. For frequency range 1 and 2, if receiver diversity is in use by the UE, the reported CLI-RSSI value shall not be lower than the corresponding CLI-RSSI of any of the individual receiver branches.

Integrated access and backhaul (IAB) enables wireless relaying in NG-RAN. The relaying node, referred to as IAB-node, supports access and backhauling via NR. The terminating node of NR backhauling on network side is referred to as the IAB-donor, which represents a gNB with additional functionality to support IAB. Backhauling can occur via a single or via multiple hops.

The IAB-node supports gNB-DU functionality to terminate the NR access interface to UEs and next-hop IAB-nodes, and to terminate the F1 protocol to the gNB-CU functionality on the IAB-donor. The gNB-DU functionality on the IAB-node is also referred to as IAB-DU.

In addition to the gNB-DU functionality, the IAB-node also supports a subset of the UE functionality referred to as IAB-MT, which includes, e.g., physical layer, layer-2, RRC and NAS functionality to connect to the gNB-DU of another IAB-node or the IAB-donor, to connect to the gNB-CU on the IAB-donor, and to the core network.

The IAB-node can access the network using either SA mode or EN-DC. In EN-DC, the IAB-node connects via E-UTRA to a MeNB, and the IAB-donor terminates X2-C as SgNB.

All IAB-nodes that are connected to an IAB-donor via one or multiple hops form a directed acyclic graph (DAG) topology with the IAB-donor as its root. In this DAG topology, the neighbor node of the IAB-DU or the IAB-donor-DU is referred to as child node and the neighbor node of the IAB-MT is referred to as parent node. The direction toward the child node is referred to as downstream while the direction toward the parent node is referred to as upstream. The IAB-donor performs centralized resource, topology and route management for the IAB topology.

F1-U and F1-C use an IP transport layer between IAB-DU and IAB-donor-CU. F1-U and F1-C need to be security-protected.

On the wireless backhaul, the IP layer is carried over the Backhaul Adaptation Protocol (BAP) sublayer, which enables routing over multiple hops. The IP layer can also be used for non-F1 traffic, such as OAM traffic.

On each backhaul link, the BAP PDUs are carried by BH RLC channels. Multiple BH RLC channels can be configured on each BH link to allow traffic prioritization and QoS enforcement. The BH-RLC-channel mapping for BAP PDUs is performed by the BAP entities on each IAB-node and the IAB-donor-DU.

The IAB-MT further establishes SRBs (carrying RRC and NAS) with the IAB-donor-CU. For IAB-nodes operating in EN-DC, the IAB-MT establishes one or more DRBs with the eNB and one or more DRBs with the IAB-donor-CU, which can be used, e.g., to carry OAM traffic. For SA mode, the establishment of DRBs is optional. These SRBs and DRBs are transported between the IAB-MT and its parent node over Uu access channel(s).

Coverage is a fundamental aspect of cellular network deployments. Cellular operators rely on different types of network nodes to offer blanket coverage in their deployments. Deployment of regular full-stack cells, e.g., cells served by a gNB type base stations usually based results in expensive implementation, high cost for equipment and backhaul connectivity. Their deployment is subjected to a variety of constraints such as expensive site leases. While this is the predominant deployment type encountered in practice, it is not always preferred cost-wise. As a result, other types of network nodes have been considered to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be considered full-stack cells similar to gNBs. The IAB node is a new type of relay node building over the front-haul architecture and constituting a node with a dual role consisting of an IAB Distributed Unit (DU) component making it possible to appear as a regular cell to the UEs which it serves, and an IAB Mobile Terminal (MT) component inheriting many properties of a regular UE whereby the IAB node connects to its donor parent node(s) or a gNB. The IAB node is based on a Layer 2 architecture with end-to-end PDCP layer from the donor IAB node to the UE for Control Plane (CP) and User Plane (UP). IAB nodes can also be classified as re-generative relays. Every packet traversing the link between the donor node and the IAB-MT component of the IAB node, i.e., the backhaul-link, must be properly decoded and re-encoded by the IAB node for further transmission to the UE on the access link. The first version of IAB in Rel-16 NR assumes half duplex operation in TDM between access and backhaul links for transmission and reception by the IAB node but includes features for forward compatibility towards evolving IAB using full duplex operation. Rel-17 NR further enhances IAB operation with better support of full duplex implementations of IAB nodes.

Another type of network node is the RF repeater which amplifies-and-forwards any signal that it receives. RF repeaters have seen a wide range of deployments in 2G GSM/(E)GPRS, 3G WCDMA/HSPA and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. The main disadvantage is that they amplify both desired signal(s) and (undesired) noise and hence, often contribute to an increase of interference levels observed at system level. Within RF repeaters, there are different categories depending on the power characteristics and the amount of spectrum that they are configured to amplify, e.g., single band, multi-band, etc. RF repeaters are considered non-regenerative type of relay nodes. RF repeaters are typically full-duplex nodes and they do not differentiate between UL and DL transmissions or receptions. LTE specifies RF repeater requirements in 36.106. Their use is limited to LTE FDD bands.

In Rel-17 NR, RF and EMC requirements in FR1 and FR2 for RF repeaters using NR were introduced. As NR often uses higher frequencies, e.g., 3-4 GHz in FR1 and above 24 GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are TDD. In consequence, simultaneous or bi-directional amplify-and-forward as employed by traditional RF repeaters is not always necessary (unlike in the FDD LTE case) and can therefore be avoided. This much reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater operating in the NR network implies that the prerequisite beamforming gains for NR operation to provide coverage are not available when relaying the NR transmissions and receptions. While a conventional RF repeater presents a very cost-effective means of extending network coverage, it has limitations when considering NR.

Therefore, a new type of network node, somewhere in-between RF repeaters and IAB nodes is a compelling proposition to try to leverage the main advantages of both. That new type of network node, i.e., a smart repeater (SR) or network-controlled (NETCON) repeater (NCR) can make use of some side control information (SCI) to enable a more intelligent amplify-and-forward operation in a system with TDD access and multi-beam operation. SCI allows a network-controlled or smart repeater to perform the amplify-and-forward operation in a more efficient manner. Potential benefits include mitigation of unnecessary noise amplification, transmissions and receptions with better spatial directivity, and much simplified network integration. In the control plane (C-plane), a SR may be provided or configured by the gNB with information on semi-static and/or dynamic downlink/uplink configuration, adaptive transmitter/receiver spatial beamforming, Tx ON/OFF status, etc. In the user plane (U-plane), the SR is still non-regenerative, e.g., it employs amplify-and-forward to relay the actual UE signals from/to the gNB. SCI transmission and requires only low capacity for the control backhaul between the donor cell(s), e.g., gNB and the SR. As a result, the low-complexity and low-cost properties of RF repeaters are mostly preserved while a degree of network configurability and control is enabled similar to eIAB nodes.

Figure 5:
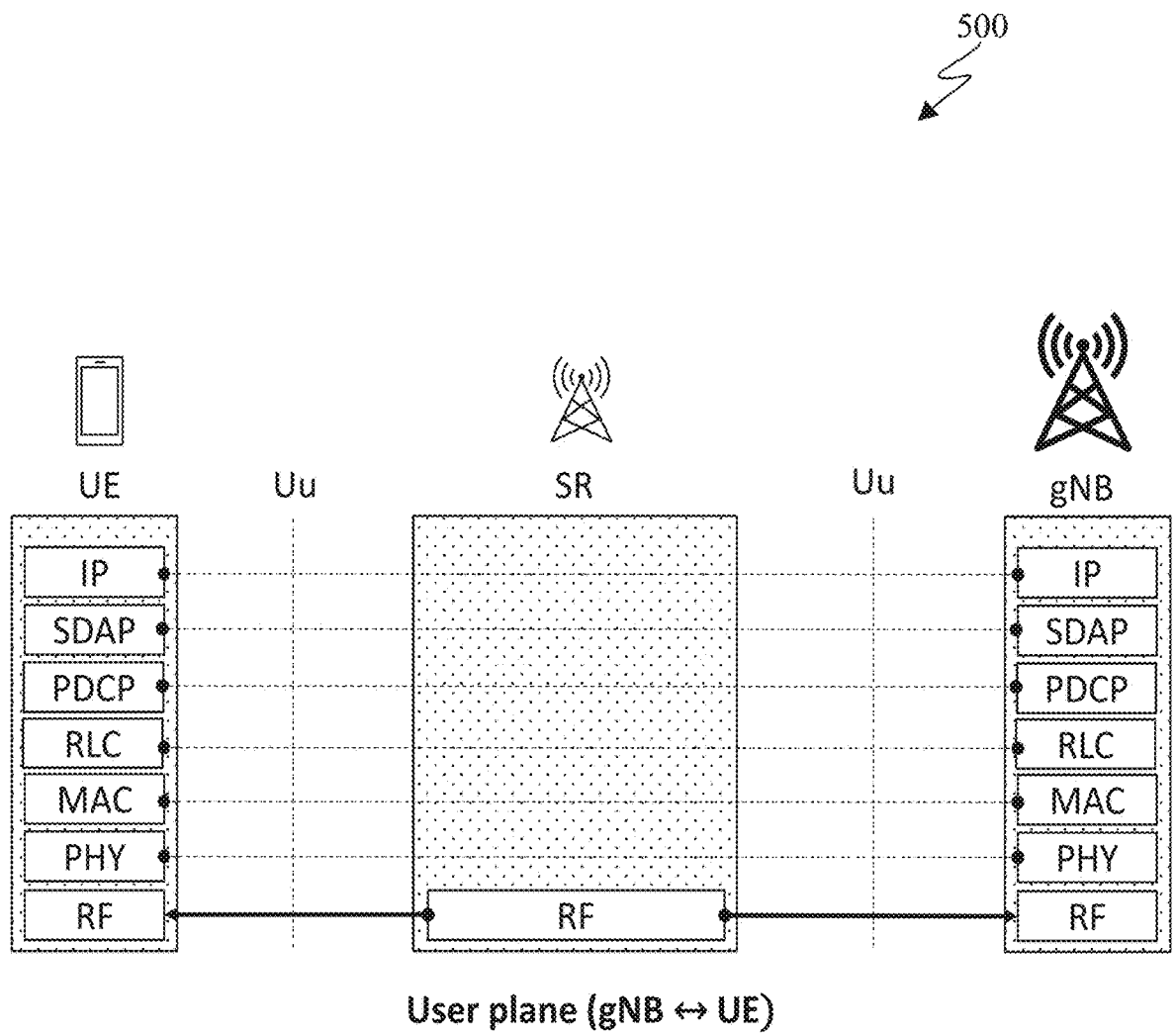
FIG. 5 illustrates an example user plane protocol architecture for smart repeater according to embodiments of the present disclosure.

FIG. 5 illustrates an example user plane protocol architecture for a smart repeater 500 according to embodiments of the present disclosure. The embodiment of the user plane protocol architecture for the smart repeater 500 illustrated in FIG. 5 is for illustration only. FIG. 5 does not limit the scope of this disclosure to any particular implementation of the user plane protocol architecture for the smart repeater 500.

Figure 6:
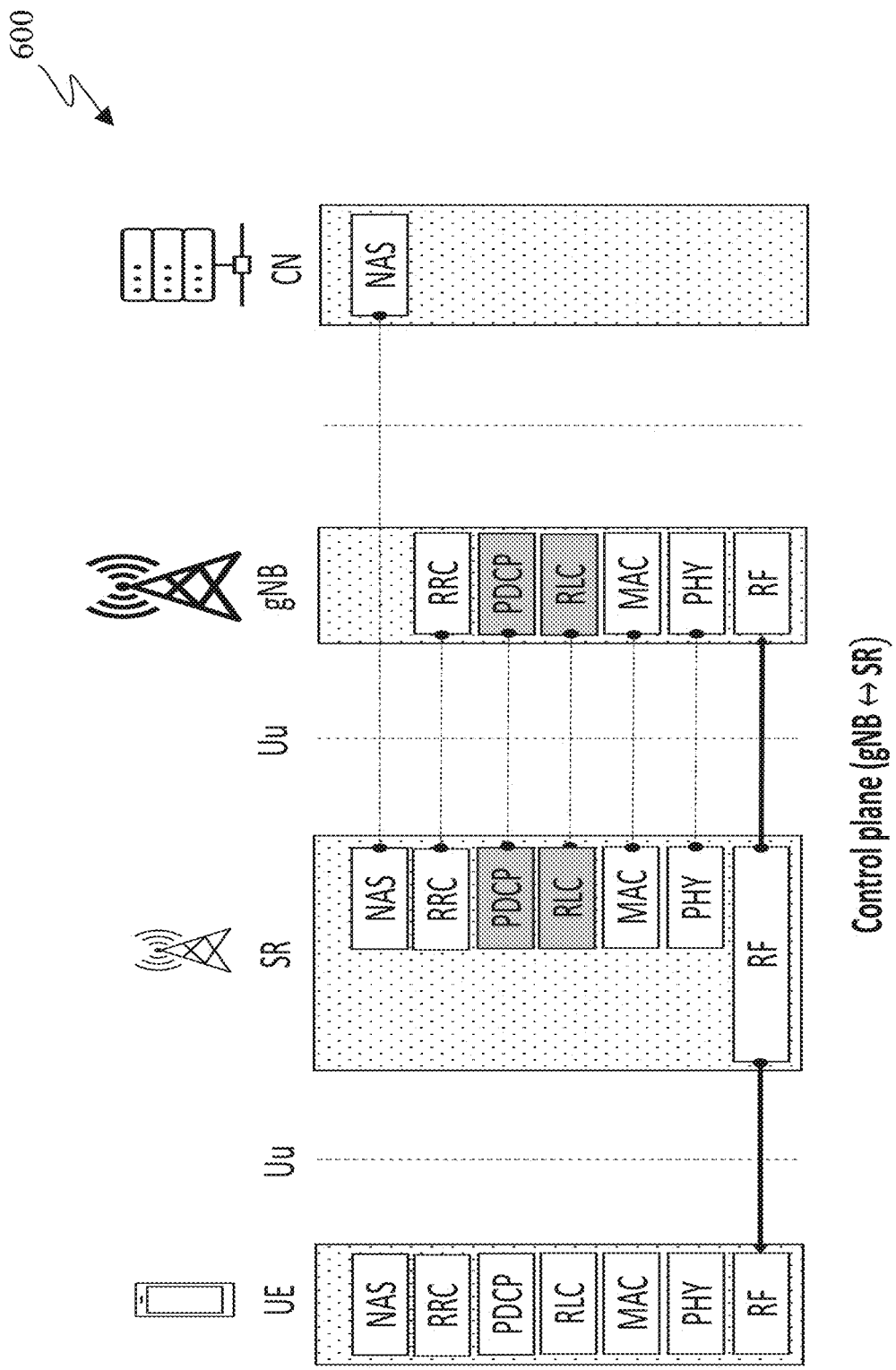
FIG. 6 illustrates an example control plane protocol architecture for smart repeater according to embodiments of the present disclosure.

FIG. 6 illustrates an example control plane protocol architecture for a smart repeater 600 according to embodiments of the present disclosure. The embodiment of the control plane protocol architecture for the smart repeater 600 illustrated in FIG. 6 is for illustration only. FIG. 6 does not limit the scope of this disclosure to any particular implementation of the control plane protocol architecture for the smart repeater 600.

Figure 7:
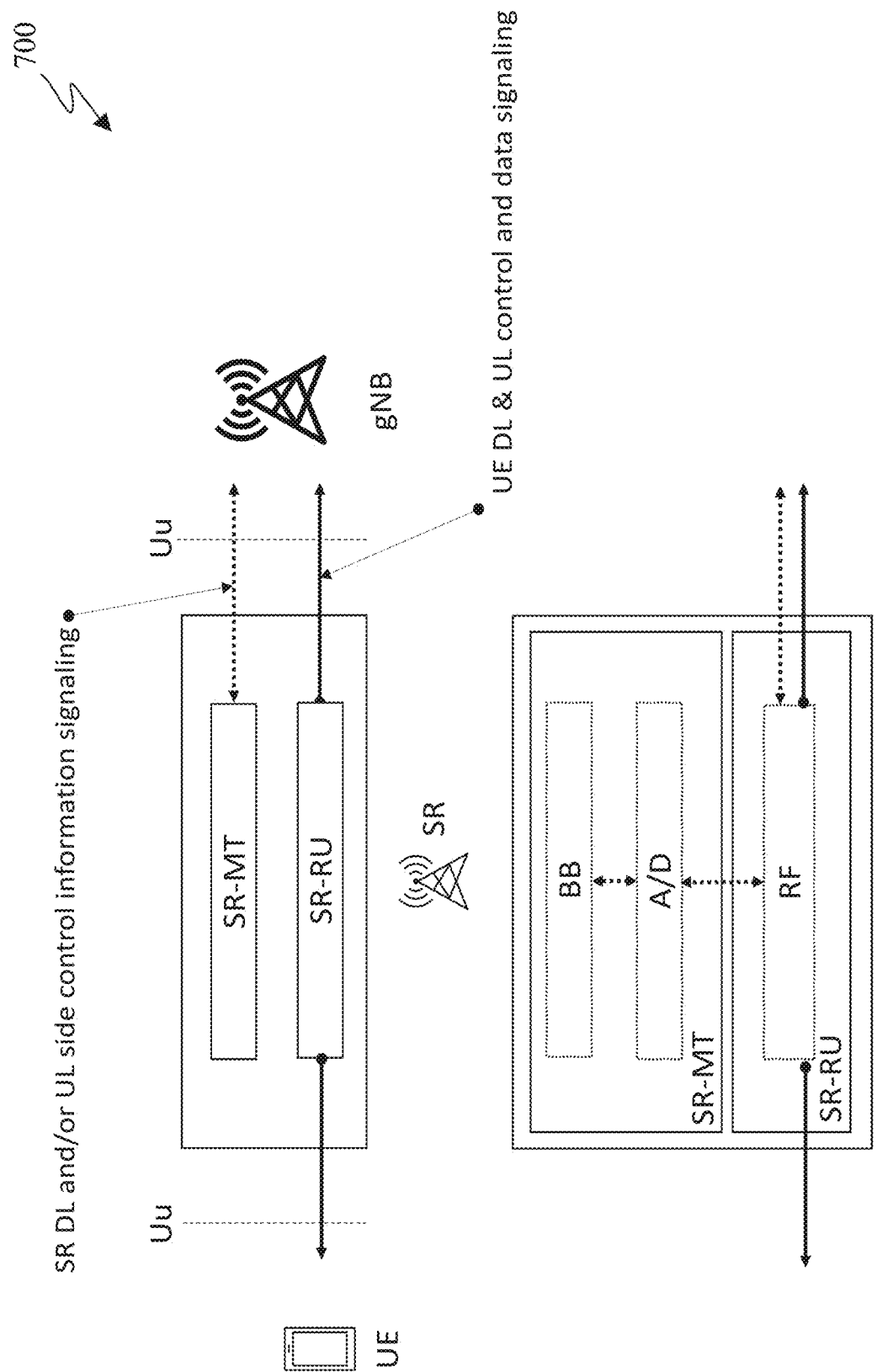
FIG. 7 illustrates an example functional architecture for smart repeater according to embodiments of the present disclosure.

FIG. 7 illustrates an example functional architecture for a smart repeater 700 according to embodiments of the present disclosure. The embodiment of the functional architecture for the smart repeater 700 illustrated in FIG. 7 is for illustration only. FIG. 7 does not limit the scope of this disclosure to any particular implementation of the functional architecture for the smart repeater 700.

FIGS. 5-7 show an example for the functional and protocol architectures of a SR or NCR. Throughout the present disclosure an SR-MT is also referred to as NCR-MT, an SR-RU is also referred to as NCR-Fwd or NCR-RU. In various embodiments, the Uu link between the SR-MT (or NCR-MT) entity and the gNB is referred to as the SR or NCR control link (C-link) while the Uu link between the SR-RU (or NCR-Fwd) entity and the gNB is referred to as the SR or NCR forward link (or backhaul link). The Uu link between the SR-RU (or NCR-Fwd) entity and the UE is referred to as the SR or NCR access link.

In the user plane (FIG. 5), the SR receives the incoming RF signal from the gNB (or the UE) at its ingress antenna port, then amplifies-and-forwards the RF signal to its egress antenna port to the UE (or gNB). Note that similar to a conventional RF repeater, the amplified-and-forwarded signal traverses the RF path, e.g., is the signal is processed in analog domain. In the control plane (FIG. 6), e.g., when transmitting DL side control information (DL SCI) from gNB to the SR, or when transmitting UL side control information (UL SCI) from the SR to the gNB, the signal processing by the SR differs. For transmission of DL SCI, the gNB can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be assumed that the SR converts part of the incoming (DL) RF signal from the gNB to digital domain to determine presence and further process the received signaling contents of DL SCI. For transmission of UL SCI to the gNB, it may be assumed that the SR receives the incoming RF signal from the UE at its ingress antenna port, then amplifies-and-forwards the RF signal while adding the UL SCI following its conversion from digital signaling processing to analog domain for transmission at the egress antenna port (FIG. 7). For transmission of UL SCI, the SR can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the SR may also be configured or provisioned or receive or transmit signaling messages using non-access stratum (NAS) protocol messages, e.g., CM, SM, etc., and/or by O&M signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

Various embodiments, methods, and examples described in the present disclosure can apply beyond NCR/smart repeaters to other nodes with a repeater/relay-like functionality in a wireless network, such as reconfigurable intelligent surfaces (RIS), metamaterials, and so on.

One embodiment includes establishing identity and capabilities of the NCR. When an NCR node is deployed in a wireless communication system, the NCR needs to initially establish its identity and capabilities for operation in the system. For example, the NCR needs to be identified and/or authenticated by the radio access network (RAN), including one or more gNB(s), or the Core Network. For example, the NCR needs to indicate capabilities of the corresponding NCR-MT and NCR-RU to the gNB.

An NCR-MT can indicate its identity as an NCR node (separate from UEs, IAB nodes, and so on) to the gNB using various elements/steps of the random access procedure, such as by Msg1/A PRACH transmission or by Msg2/B random access response or by an indication in a Msg3/A PUSCH transmission, or using RRC messages, if applicable.

An NCR-MT can report NCR capabilities to the gNB, wherein the NCR capabilities include those of the NCR-MT or those of the corresponding NCR-RU. For example, when an NCR is identified and authenticated by the gNB, the NCR-MT can receive a PDCCH that schedules a PUSCH, wherein the NCR-MT transmits the NCR capability information in the PUSCH. In one example, the NCR can indicate its capabilities within a Msg3/A PUSCH that is scheduled by a random access response (RAR).

In the following, "beam" refers to a spatial transmission/reception filter that an entity such as an NCR-RU or NCR-MT or a UE can generate for corresponding transmissions/receptions.

In one example, the NCR capabilities include NCR-RU capabilities, such as the following:

A spatial coverage angle/area by the NCR-RU at least on the UE side of the NCR (also referred to as, the UE-side radio interface bearer or UE-side RIB, or UE-side connector) that the NCR-RU can use for transmission or reception to/from the UE(s).
- For example, the spatial coverage angle/area can be in terms of geographical points/locations/areas wherein a transmit-power profile/density of any spatial filter applied/operated by the NCR-RU is above a certain threshold. The threshold can be predetermined in the specifications or provided by the gNB signaling such as by SIB1 or SIBx dedicated to NCR nodes.
- For example, the spatial coverage angle can be in absolute units such as degrees or steradians.

a first number of antenna panels/arrays/sub-arrays or RF chains on the gNB side of the NCR (also referred to as, the base-station-side radio interface bearer or BS-side RIB, or BS-side connector, or alternatively gNB-side RIB/connector) that the NCR-RU can use for transmission or reception to/from the gNB.
- In one example, the NCR-RU can generate only one beam at a time using each of the first number of antenna panels/RF chains;
- In one example, the NCR-RU can simultaneously generate a first beam from a first antenna panel/RF chain and a second beam from a second antenna panel/RF chain, so the NCR-RU can generate N beams at a time using N antenna panels/RF chains.
- In one example, instead of reference to physical entities such as antenna panels or RF chains, the NCR reports capability with respect to logical entities such as a supported number of simultaneous beams/spatial filters that it can generate or a supported number of antenna port groups, and so on.

a second number of antenna panels/arrays/sub-arrays or RF chains on the UE side of the NCR (also referred to as, the UE-side radio interface bearer or UE-side RIB, or UE-side connector) that the NCR-RU can use for transmission or reception to/from the UE(s).
- Similar notes as above (for gNB-side RIB/connector) apply to a number of beams generated at each time by UE-side antenna panels/RF chains of the NCR-RU a third number of distinct beams that an NCR-RU can generate using a BS-side or UE-side antenna panel/array/sub-array or RF chain.
- The NCR-RU can generate the third number of distinct beams at different times, such as M different beams in M time instances.
- A first beam is considered distinct from a second beam when the first and second beams have different beam directions/directivities, for example, targeting different spatial angles, and the first and second beams have sufficiently separate beam patterns, such as no overlap between the corresponding main lobes (as defined, for example, by 3 dB threshold of the power/energy profile of the spatial filter/beam) or an overlap less than a certain predetermined or preconfigured threshold.
- In one example, the NCR-MT can report one or multiple values for the third number of distinct beams for the NCR-RU, wherein each report includes a pair (M, W). Herein, W refers to a beam-width or beam-directivity parameter, such as a spatial angle corresponding to the main lobe of each beam. Therefore, M can correspond to a number of beams that the NCR-RU (on the UE-side or BS-side) can generate with a beam-width or beam-directivity indicated by the parameter W. Herein, the parameter W can take values from a list of attributes such as 'wide' or 'narrow', or can take values from a numerical set of spatial coverage angles (for example, in degrees or in steradians) or fractions of a reference spatial coverage angle. In one example, the reference spatial coverage can refer to a total spatial angle covered by the NCR, and the fractions can be from a predetermined or (pre-)configured set of fractions, such as $\{1, \frac{1}{2}, \frac{1}{4}, \frac{1}{8}\}$, from the total spatial angle covered by the NCR. In one example, an attribute 'wide' can refer to a first fraction such as 1 or $\frac{1}{2}$, and another attribute 'narrow' can refer to a second fraction such as $\frac{1}{4}$ or $\frac{1}{8}$ of the total spatial angle covered by the NCR. For example, an NCR-MT can report (M, W)=(1, 'wide') and (M, W)=(4, 'narrow') implying that the NCR-RU can generate M=1 wide beam that covers the entire coverage area of the NCR, while the NCR-RU can generate M=4 narrow beams that collectively cover the entire coverage area of the NCR. In one example, there can be an association or rule between the paraments M and W, such as W=1/M, so indication of only one parameter, for example M, is sufficient. For example, the NCR-MT can report M=$\{1,2,4\}$.

A fourth number of symbols or an absolute time duration for beam switching latency of the NCR-RU.
- For example, the number of symbols or slots can be with respect to the SCS configuration of the initial DL/UL BWP of the NCR-MT or with respect to a reference SCS, such as 30 kHz for FR1 and 120 kHz for FR-2-1 and 480 kHz for FR-2-2, or can be with respect to an SCS explicitly provided in the SIB1 or SIBx dedicated to NCR nodes.
- For example, the absolute time duration can be in units of milli-sec or nano-sec.
- In one example, a beam switching latency can be from a time that the NCR-MT receives a command or side control information signaling from the gNB to the time that NCR-RU is ready/operational to receive/transmit with a new beam indicated by the gNB.
- In another example, a beam switching latency can be from a time that the NCR-RU stops receiving/transmitting using a previous/old beam until a time NCR-RU is ready/operational to receive/transmit with a new beam indicated by the gNB.

NCR capability can include other beam generation capabilities of the NCR-RU, such as beam pattern, beam sensitivity, beam directivity, and so on.

In one example, the NCR capabilities include NCR-MT capabilities, that can be based on, or a simplification of UE capabilities or feature groups as captured in TR 38.822 v16.2.0.

One embodiment includes providing UEs' SRS configuration information by the gNB to the NCR-MT, and reporting the UEs' SRS measurements by NCR to the gNB.

The gNB can provide configuration information of SRS(s) corresponding to one or more UE(s) to the NCR-MT. The NCR can measure the indicated SRSs and report SRS measurement results to the gNB. The SRS measurements by the NCR can include, for example, SRS RSRP or SRS Rx timing. The NCR-MT can receive configuration information of corresponding SRSs as part of downlink side control information (SCI) and can transmit SRS measurement reports as part of uplink SCI.

Herein, SRS configuration information can include one or more of, for example, time/frequency (T/F) resources corresponding to the SRS(s), periodicity and slot offset, number of OFDM symbols, index of starting OFDM symbol, frequency hopping parameters, SRS sequence generation parameters, such as SRS transmission comb, number of SRS antenna ports, any applicable IDs such as UE IDs or other random or deterministic parameters that impact SRS sequence detection, and so on.

In one example, the NCR-MT can be provided spatial setting(s) for reception of the indicated SRSs. For example, a spatial setting, such as a TCI state or a spatial relation info can be based on QCL relationship with an SSB or CSI-RS, configured to the NCR-MT. For example, the NCR-MT receives an SRS with a same beam that the NCR used to transmit or amplify-forward (AF) an SSB or a CSI-RS. In another example, when the NCR-MT reports a capability to generate a number of NCR-RU beams (such as 4 NCR beams on the UE-side of NCR), and the gNB is aware of a mapping among UE-side NCR beams and a set of SSBs or CSI-RSs that are associated with the indicated SRSs, the NCR can be provided information of an NCR beam index that is mapped to an SSB or CSI-RS that is associated with the SRS. For example, if a first SRS is associated with SSB index #2 or CSI-RS with ID #5, and the SSB index #2 or CSI-RS with ID #5 is mapped to UE-side NCR beam index #3, then the NCR-MT is indicated NCR beam index #3 as a spatial setting for the first SRS.

In one example, the NCR can be provided an SCS for SRS measurement that can be SRS-specific or can be common to all indicated SRSs. In another example, the NCR is provided a reference SCS, predetermined in the specifications, or provided by pre-configuration or by higher layer configuration, or by L1/L2 signaling, such as a signaling for side control information that triggers the SRS measurement. In one example, the SCS for SRS measurement can be same as an SCS that is provided to the NCR in a (most recent) beam indication message or beamforming information side control information (SCI).

Such method can be beneficial, for example, to determine whether a (candidate) UE is served through the NCR, or whether the UE is served directly through the gNB.

Herein, the gNB determines, up to gNB implementation, a set of UE(s) for which SRS measurement is requested from the NCR, or a set of SRSs whose information is provided to the NCR. For example, when a first UE is already determined to be within coverage area of an NCR, the gNB can request the NCR for SRS measurements corresponding to the first UE, so that the gNB can determine whether the UE has moved within or outside the NCR coverage area. Such information can be useful, for example, for suitable (re-) configuration or scheduling of the first UE, as well as for providing suitable beamforming information to the beam indication message or the beamforming information SCI, or updates thereof, provided to the NCR, based on any mobility of the first UE.

In another example, when the gNB determines that a second UE is close to the NCR coverage area, the gNB can provide configuration information of the SRS(s) corresponding to the second UE to determine whether the second UE has/would enter(ed) the NCR coverage area. When the second UE enters the NCR coverage area, the gNB needs to provide/update the beam indication message or the beamforming information SCI based on information of the second UE.

For example, when SRS RSRP measured by the NCR is larger than the SRS RSRP measured internally at the gNB, the gNB determines that the UE is served via the NCR. But, if SRS RSRP measured by the NCR is smaller than the SRS RSRP measured internally at the gNB, the gNB determines that the UE is directly connected to the gNB.

For example, when SRS Rx timing measured by the NCR is earlier than the SRS Rx timing measured internally at the gNB, the gNB determines that the UE is served via the NCR. But, if SRS Rx timing measured by the NCR is later than the SRS Rx timing measured internally at the gNB, the gNB determines that the UE is directly connected to the gNB.

In one example, the UE identity may be known to the NCR, such as by a C-RNTI associated with the UE, or by a separate ID that is used for coordination between gNB and NCR, and may be unknown/unused by the UE. In another example, UE identity is transparent to the NCR, and only SRS information is available to the NCR, without any association with one or multiple UE(s). For example, the NCR may not know whether a first indicated SRS and a second indicated SRS correspond to a same UE or two different UEs.

In one example, the NCR-MT can be provided by the gNB a transmission power or an estimate thereof for the SRSs, or can be provided power control parameters for the UL SRS transmission by the corresponding UE(s). In one example, the NCR-MT (locally) estimates a pathloss value that the corresponding UE(s) apply when calculating a transmission power for the SRSs. In another example, the NCR-MT is provided a gNB-estimate of a pathloss value that the corresponding UE(s) apply when calculating a transmission power for the SRSs. In another example, the NCR need not know a transmission power of the SRSs, and the NCR determines a received power for SRSs, regardless of a transmission power of SRSs by the UE(s).

In one example, the gNB provides as part of side control information (SCI) to the NCR an indication of one or more of: configured symbol allocations for SRS transmission by a UE in a slot, the SRS periodicity, the SRS transmission bandwidth, the SRS frequency hopping behavior, and the SRS sequence generation parameters of a UE which were configured by the gNB for the UE are also provided to the NCR. For example, the gNB can use pre-configuration or higher layer signaling such as RRC signaling carrying side control information to provide the SR with such SRS configuration parameters for a UE being relayed. When the NCR uses the provided receive timing adjustment value or window/range in a slot to configure its assumed reception timing for UL transmissions, for example, SRS, from UEs whose signals are measured, complexity and power consumption in the NCR digital front-end and the NCR baseband are reduced. When attempting to demodulate and decode the SRS received from the UE, the NCR can process fewer candidate time instances than when the NCR attempts to receive the SRS in absence of knowledge of the UE UL transmit timing. Estimation quality of the SRS is increased because the received signal is correlated against fewer signal hypotheses. The NCR can implement beam management functionality for DL transmissions (egress) to the UEs being relayed and for UL receptions (ingress) for the UEs. The assumed reception timing in the NCR for the UL transmissions from the UEs is controlled by the gNB. The gNB controls the UE UL transmission timing of UEs being relayed by the NCR as in existing state-of-the-art and the SCI signaling load is minimal.

It is assumed that the NCR can measure an indicated SRS in a correct time, and report accurate SRS measurements to the gNB.

In one example, the NCR can measure an indicated SRS with a subcarrier spacing (SCS):
  same as an SCS configured to the UE for the active BWP confining the SRS resource—can be indicated to the NCR, or
  an SCS indicated in a L1/L2 signaling the triggers the SRS measurement, or
  a reference SCS that is predetermined in the specifications for system operation, or is (pre-)configured for the NCR-MT or provided to the NCR-MT via higher layers.

In one example, the NCR is not expected to perform SRS measurements such as SRS-RSRP or SRS Rx timing measurements for an indicated SRS resource which is not fully confined within the pass band of the NCR.

In one example, the NCR-MT can report a first capability for a number of SRS resources that the NCR can receive in a time slot/subframe, or a second capability for a number of SRS resources that the NCR can measure in a time slot/subframe. For example, there can be a maximum for supported values of such NCR capabilities. For example, the NCR is not expected to measure more than 32 SRS resources, and the NCR is not expected to receive more than 8 SRS resources in a slot.

Figure 8:
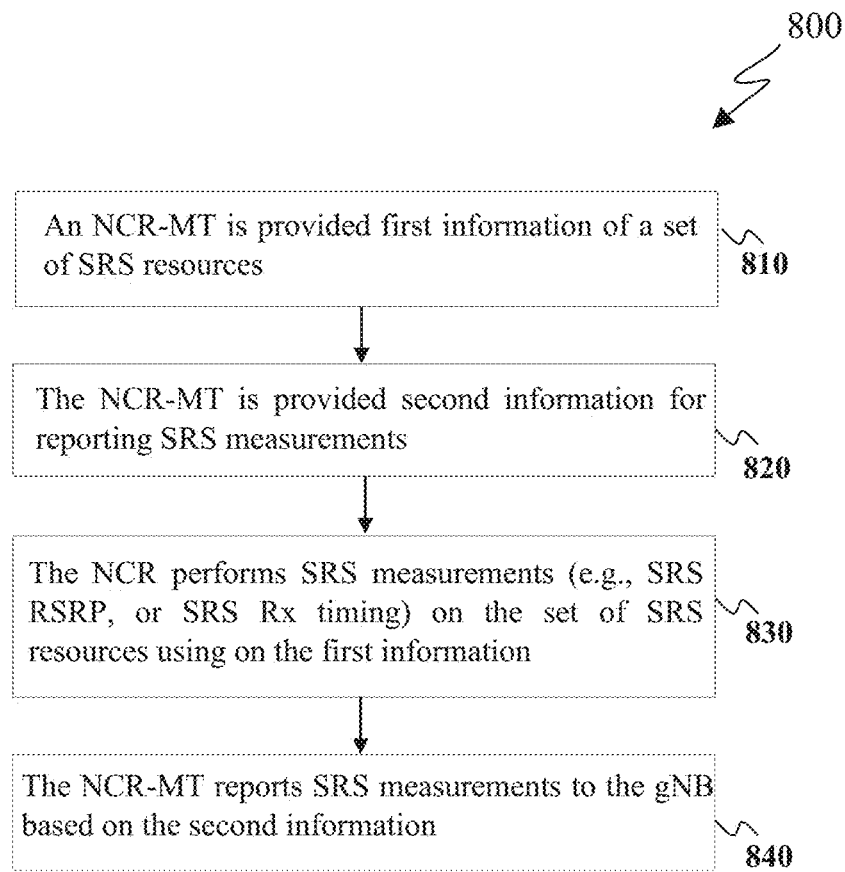
FIG. 8 illustrates an example flowchart for SRS measurement reporting by the NCR according to embodiments of the present disclosure.

FIG. 8 illustrates an example flowchart for SRS measurement reporting by the NCR 800 according to embodiments of the present disclosure. The embodiment of the flowchart for SRS measurement reporting by the NCR 800 illustrated in FIG. 8 is for illustration only. FIG. 8 does not limit the scope of this disclosure to any particular implementation of the flowchart for SRS measurement reporting by the NCR 800.

As illustrated in FIG. 8, at step 810, an NCR-MT is provided first information of a set of SRS resources. At step 820, the NCR-MT is provided second information for reporting SRS measurements. At step 830, the NCR performs SRS measurements (e.g., SRS RSRP, or SRS Rx timing) on the set of SRS resources using on the first information. At step 840, the NCR-MT reports SRS measurements to the gNB based on the second information.

One embodiment includes reporting the contents of SRS measurements by the NCR. The NCR can be (pre-)configured/indicated to report various measurements from indicated SRSs transmitted by UEs. The NCR measurement report can include an SRS resource ID along with an SRS RSRP range that includes an SRS RSRP value measured by the NCR, or an SRS Rx timing (or relative arrival time) that is a slot/subframe in which the NCR receives an indicated SRS relative to a reference time, such as a reception time at the NCR of an SSB or CSI-RS or DL PRS that is transmitted by the gNB and is associated with the indicated SRS.

In one embodiment, the NCR can report SRS-RSRP for the indicated SRSs. For example, a measurement report can include an SRS-RSRP value or an SRS RSRP range that includes the measured SRS RSRP. In one example, the NCR can be provided information of a number of SRS RSRP ranges, wherein the information can be predetermined in the specifications for system operation, or can be provided by pre-configuration or by higher layer signaling or by L1/L2 signaling, such as one for side control information, or one that triggers an SRS measurement report.

Herein, an SRS reference signal received power (SRS-RSRP) is defined as linear average of the power contributions (in [W]) of the resource elements carrying sounding reference signals (SRS). SRS RSRP shall be measured over the configured resource elements within the considered measurement frequency bandwidth in the configured measurement time occasions.

In one embodiment, the NCR can report SRS received (Rx) timing $T_{SRS-Rx}$ (may be also referred to as, an UL/SRS relative time of arrival 'RTOA' $T_{UL-RTOA}$ or $T_{SRS-RTOA}$) at the NCR, relative to:
  a UE transmission time of the corresponding SRS, or
  an NCR reception time of an SSB or CSI-RS that is transmitted by the gNB and is associated with the corresponding SRS, or
  a gNB transmission time of a reference signal such as SSB or CSI-RS that is associated with the corresponding SRS, or
  an NCR transmission time of a reference signal such as an SSB or CSI-RS that is associated with the corresponding SRS, such as an SSB or CSI-RS that the NCR is amplify-and-forwarding (AF-ing) from gNB to a UE corresponding to the SRS, or that the NCR is locally generating and transmitting to the UE, or
  a reference time.

In one example, an SRS Rx timing (or UL/SRS RTOA) is the beginning of subframe i containing SRS received in an NCR, relative to a Rx-timing/RTOA Reference Time, wherein the Rx-timing/RTOA Reference Time can be defined as $T_0 + t_{SRS}$, where:
  $T_0$ is the nominal beginning time of SFN 0 provided by SFN Initialization Time,
  $t_{SRS}(10n_f + n_{sf}) \times 10^{-3}$, where $n_f$ and $n_{sf}$ are the system frame number and the subframe number of the UE's SRS, respectively, as indicated to the NCR.

For example, information of corresponding parameters such as $T_0$ and $n_f$ and $n_{sf}$ can be determined by or indicated to the NCR.

In another example, an SRS Rx timing (or UL/SRS RTOA) can be defined as $T_{SubframeRx,UE} - T_{SubframeRx,gNB}$, where: $T_{SubframeRx,UE}$ is the time when the NCR receives the start of one subframe that includes the corresponding SRS transmitted from a UE, and $T_{SubframeRx,gNB}$ is the time when the NCR receives the corresponding start of one subframe from the gNB that is closest in time to the subframe received from UE. For example, the subframe from the gNB may or may not include any gNB transmission or reception. For example, the subframe from the gNB can be one that includes an SSB or a CSI-RS or a downlink positioning reference signal (DL PRS) that is transmitted by the gNB and is associated with the SRS. The association of SSB or CSI-RS or DL PRS with the SRS can be explicitly/separately indicated to the gNB or can be implicitly determined by the NCR, for example, based on a spatial setting or TCI state corresponding to the SRS resource.

In another example, an SRS Rx timing (or UL/SRS RTOA) can be defined as $T_{SubframeRx,UE} - T_{SubframeTx,gNB}$, where: $T_{SubframeRx,UE}$ is same as above, and $T_{SubframeTx,gNB}$ is the corresponding start of one subframe from the gNB that is closest in time to the subframe received from UE. For example, the subframe from the gNB can be as described above. For example, information of the subframe from the gNB can be provided to the NCR explicitly, for example, in a gNB indication that triggers the SRS measurement. In another example, NCR is provided corresponding timing parameters, and the NCR-MT can determine the gNB Tx subframe based on the parameters.

In yet another example, an SRS Rx timing (or UL/SRS RTOA) can be defined as $T_{NCR-Rx} - T_{NCR-TX}$ where $T_{NCR-RX}$ is the NCR received timing of downlink subframe #i from a UE corresponding to an indicated SRS, defined by the first detected path in time, and $T_{NCR-TX}$ is the NCR transmit timing of uplink subframe #j that is closest in time to the subframe #i received from the UE. For example, subframe #j may or may not include any NCR transmission or reception. For example, subframe #j can be a subframe that includes a start of an NCR transmission, such as an SSB or CSI-RS or a DL PRS that is associated with the corresponding SRS. For example, the SSB or CSI-RS can be one that the NCR is amplify-and-forwarding (AF-ing) from gNB to a UE corresponding to the SRS, or one that the NCR is locally generating and transmitting to the UE.

In one example, a reference time for determination of SRS Rx timing can be a time/frequency resource, such as a time slot that is explicitly indicated to the NCR. In another example, a reference time can be a slot/subframe with smallest index in a most recent side control information provided to the NCR, such as for beamforming indication (also known as, a beam indication message).

In various examples, multiple SRS resources can be used to determine the beginning of one subframe containing SRS received at an NCR. In various example, multiple SSB or DL PRS or CSI-RS (for example, for tracking) resources, as instructed by (pre-)configuration or by higher layers of the NCR-MT, can be used to determine the start of one subframe of a first arrival path of the NCR for a reception from the gNB or a UE.

In various examples, depending on the type of NCR, such as power class or RF characteristics of the NCR, and/or depending on an operating frequency range for the UE/NCR, the reference point for $T_{SRS-Rx}/T_{UL-RTOA}$ can be the Rx/Tx antenna connector for the NCR or a UE-side/gNB-side RIB or Rx/Tx transceiver array boundary connector. Similar, for timing of transmissions involving UE and the gNB, the reference point can be Rx/Tx antenna connector for the UE/gNB or a Rx/Tx transceiver array boundary connector or RIB for the UE/gNB.

In one embodiment, the NCR-MT can be configured/indicated to alternatively/additionally report other metrics corresponding to the indicated SRSs, such as one or more of SRS signal quality metrics, for example RSRQ, RSSI, SNR, SINR, and so on, or other SRS timing aspects, for example NCR-estimate of a UE timing advance (TA) based on transmission time and reception time of the corresponding SRS, and so on.

In one embodiment, the NCR-MT can indicate a set of SRS resources or UE IDs as recommended SRSs/UEs that the NCR-MT finds likely to be served through the NCR. For example, the NCR indicates an SRS or a corresponding UE ID, if applicable, when SRS RSRP measurements are larger than a first threshold, or when SRS Rx timing is smaller than a second threshold. For example, the first and second thresholds can be predetermined in the specifications for system operation, or can be provided by pre-configuration or by higher layer signaling or by L1/L2 signaling, such as one for side control information, or one that triggers an SRS measurement report.

In various embodiments, an SRS measurement report can include an SRS resource ID, wherein the SRS resource ID is according to an identity provided to the NCR-MT in the configuration/indication of SRSs to be measured. The SRS resource ID indicated to the NCR-MT can be same as or different from an SRS resource ID that is configured to a corresponding UE. For example, the gNB can indicate a first SRS from a first UE with an SRS resource ID configured to the first UE being #2, and a second SRS from a second UE with an SRS resource ID configured to the second UE also being #2. To distinguish the first SRS from the second SRS at the NCR-MT, the gNB can indicate the first SRS with an SRS resource ID indicated to the NCR-MT as being #2 (or even #4), and the second SRS with an SRS resource ID indicated to the NCR-MT as being #3.

In various embodiments, the NCR-MT can report SRS measurements for a single time instance, such as a single slot, or can correspond to multiple time slots, such as all time slots within a time period. For example, the NCR can report information of the corresponding time period, such as a number of or indexes of corresponding time slots, or an index of a first time slot and a length of the time period, and so on. In one example, such information can be implicit, for example, a time period can be one since a time/slot when SRS measurement for the indicated SRS was triggered by the gNB or since a time/slot corresponding to a most recent SRS measurement report for the same indicated SRS.

In one example, the NCR-MT reports filtered SRS measurements, such as L1-filtered or L-3 filtered SRS RSRP or corresponding filtered/averaged versions of timing metrics, wherein coefficients for the L1/L3 filter can be provided/(pre-)configured/indicated by the gNB or based on NCR implementation.

In various embodiments, the NCR is allowed to skip an SRS measurement report when a corresponding measurement result is outside a 'valid' range. Such behavior can be beneficial to reduce a signaling overhead between NCR and gNB, for example, when SRS RSRP is smaller than a first threshold, or when SRS reception timing is larger than a threshold, so that the NCR/gNB can infer that a corresponding UE is not served through the NCR, or that a corresponding SRS has a spatial setting that is facing away from the NCR. The gNB can decide whether/how to update the corresponding SRS, such as to indicate to the NCR another SRS for the same UE or to indicate an SRS corresponding to a different UE. In one example, the NCR does not skip the measurement report, rather the NCR reports an out-of-range (OOR) value as a measurement report, such as a range index 0 or range index −1.

One embodiment includes signaling to trigger SRS measurement by the NCR and to indicate resources for the NCR report. The gNB can (pre-)configure the NCR for SRS measurement and reporting, such as for periodic measurement and reporting, or can trigger an SRS measurement and reporting by L1/L2 indication, such as for aperiodic measurement and reporting. In addition, the NCR can report SRS measurements in a PUCCH resource configured to the NCR-MT or can include such measurement reports in a PUSCH transmission from the NCR-MT to the gNB, such as by a MAC-CE included in the PUSCH or as L1 uplink SCI multiplexed in the PUSCH.

In one example, the NCR-MT can be provided information of parameters and settings for SRS measurement and reporting by:
   pre-configuration of NCR, or
   higher layer signaling, or
   L1/L2 signaling.

For example, in the case of pre-configuration, it is up to gNB implementation (whether) to ensure that indicated SRS resources map to one configured for UEs.

The gNB indication can trigger SRS measurement and reporting for one or more SRSs corresponding to one or more UE(s).

The gNB (pre-)configuration/indication for SRS measurement can include one or more of: a set of SRS resource IDs or a indexes of SRS resource sets/groups; corresponding configuration information for the indicated SRSs; settings for SRS measurements, such as L1/L3 filter coefficients, a number of SRS resources to be combined, or a periodicity over which SRS measurement applies, and so on.

The gNB (pre-)configuration/indication for SRS measurement reporting can include one or more: a periodicity of reporting, PUCCH resource(s) (pre-)configured for the NCR-MT to report SRS measurements, a beta-offset value that is used for determination of a number of resource elements from a PUSCH in which the NCR-MT would/can multiplex the SRS measurement reports, and so on.

In one example, a DCI format for NCR-MT can trigger an aperiodic or activate a semi-persistent reporting of SRS measurements, and also indicate corresponding reporting parameters, such as indicating a PUCCH resource or scheduling a PUSCH that is to multiplex the SRS measurement reports, along with a corresponding beta offset. Herein, a PUCCH resource can be a periodic (or semi-persistent) PUCCH resource or can be an aperiodic PUCCH resource indicated to the NCR, such as by the L1/L2 signaling, for example a DCI format, that triggers the SRS measurement reporting.

In one example, the NCR-MT is (pre-)configured with configured grant PUSCH (CG-PUSCH) that the NCR-MT can use for transmitting SRS measurement reports to the gNB.

In one example, the NCR is (pre-)configured a number of MAC-CE commands, such as a first one for reporting SRS RSRP report and a second one for SRS Rx timing report, wherein the UE can include a corresponding SRS ID and the corresponding measurement result. In one example, a same MAC-CE can be used for reporting measurements corresponding to multiple metrics, such as both SRS RSRP and SRS Rx timing. In another example, a same MAC CE can be used for reporting SRS measurements corresponding to multiple SRS resource, wherein an SRS resource ID is indicated for each (set of) SRS measurement.

In one example, for a UE that is in RRC connected mode, other signals or channels can be used for NCR measurement, instead of or in addition to SRS. For example, the NCR-MT can be provided configuration information of CG-PUSCH or periodic PUCCH corresponding to one or more UE(s), and the NCR-MT can provide measurements such as power or timing for such channels. In one example, power measurements can be based on EPRE or can be based on DMRS RSRP, and so on.

One embodiment includes reporting NCR measurements from UEs' PRACH transmission to the gNB. The NCR can determine configuration information of PRACH in a cell governed by a gNB from system information, and the NCR-MT can report to the gNB about the NCR measurements from UEs' PRACH transmission, including PRACH received power such as PRACH EPRE (Energy Per Resource Element) or PRACH reception timing or a 'local' estimate of the UE timing advance (TA) at the NCR. The NCR-MT can transmit PRACH measurement reports as part of uplink SCI using a MAC-CE or an UL SCI included in a PUSCH or a PUCCH. The measurement report can also include indication of one or more of: a PRACH preamble, a random access occasion (RO), an SSB associated with the PRACH, and so on.

Definitions for PRACH power or timing measurements can be similar to those for SRS measurement described herein.

One embodiment includes time/frequency-specific or spatial domain ON/OFF for the NCR-RU. The NCR-MT can receive an indication to apply a time/frequency-specific or a spatial-domain/angular-specific ON/OFF or muting pattern for NCR-RU operation, such as for the amplify and forward (AF) operation.

In one example, the NCR is provided angular ON/OFF indication information. For example, the gNB orders a second NCR node to turn off in the T/F resources associated with a first SSB that is regenerated or AF by the first NCR. Such behavior can be beneficial for the gNB to determine a UE is associated with a first NCR node or a second NCR node, when (i) the UE transmits a PRACH in an RO that is associated with a first SSB, and (ii) the first SSB is regenerated or AF by both the first NCR node and the second NCR node (e.g., when the first and second NCR nodes are in geographically overlapping or close areas/zones).

For example, the UE can be configured a first CSI-RS resource that is QCL with the first SSB(s) transmitted by the gNB and not passed via AF by the NCR, and a second CSI-RS resource (in different time/frequency) that is QCL with the first SSB(s) transmitted by the gNB and also passed via AF by the NCR. The gNB receives CSI/beam measurements from the UE for both the first and second CSI-RS resources, and compares to determine whether the UE is directly covered by the gNB or covered via the NCR node. It is noted that, The CSI/beam report is carried by PUSCH/PUCCH from the UE, so NCR node cannot read the report.

For example, muting pattern can be applied for NCR beamforming information or short-term time-/frequency-specific ON/OFF information can be used (with fine T/F resource granularity) to switch off the NCR-RU node during a CSI-RS or SSB transmission by the gNB, so that NCR-RU does not perform AF on the indicated T/F resources.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a network-controlled repeater (NCR), the method comprising:
receiving, by an NCR mobile termination (NCR-MT) entity:
first information for reception parameters of a set of uplink (UL) signals or channels, and
second information for reporting a metric corresponding to the set of UL signals or channels;
receiving, on an access link of an NCR forwarding (NCR-Fwd) entity, based on the first information, an UL signal or channel from the set of UL signals or channels;
determining, by the NCR-MT entity:
a measurement for the UL signal or channel, and
a value for the metric based on the measurement; and
transmitting, by the NCR-MT entity, a physical uplink shared channel (PUSCH) or a physical uplink control channel (PUCCH) that provides the value.

2. The method of claim 1, wherein:
the UL signal or channel is a sounding reference signal (SRS),
the metric is an SRS reference signal received power (SRS-RSRP),
the value is an index for an RSRP range, from a set of RSRP ranges, that includes the SRS-RSRP, and
the set of RSRP ranges is predetermined or provided by higher layers.

3. The method of claim 1, wherein:
the UL signal or channel is a physical random access channel (PRACH),
the metric is an energy per resource element (EPRE),
the value is an index for an EPRE range, from a set of EPRE ranges, that includes the EPRE for the PRACH, and
the set of EPRE ranges is predetermined or provided by higher layers.

4. The method of claim 1, wherein:
the UL signal or channel is a sounding reference signal (SRS) or a physical random access channel (PRACH),
the metric is a relative time of arrival (RTOA) for the SRS or the PRACH, and
the RTOA is an offset between a slot or symbol for reception, by the NCR-Fwd entity, of the SRS or the PRACH and a slot or symbol for one of:
reception, by the NCR-MT entity, of a synchronization signal block (SSB) or a channel state information reference signal (CSI-RS) associated with the SRS or the PRACH,
transmission of the SSB or CSI-RS, or
transmission of the SRS or the PRACH.

5. The method of claim 1, wherein:
the UL signal or channel is a physical random access channel (PRACH), and
the metric is a timing alignment (TA).

6. The method of claim 1, further comprising:
receiving a downlink control information (DCI) format or a medium access control control-element (MAC CE) that indicates:
an identity (ID) of the UL signal or channel,
to receive the UL signal or channel, and
to determine the measurement of the UL signal or channel.

7. The method of claim 1, wherein:
the UL signal or channel is a physical random access channel (PRACH), and
the PUSCH or the PUCCH further provides one or more of:
a random access channel (RACH) occasion,
a synchronization signal block (SSB) index, or
a PRACH preamble index
associated with the PRACH.

8. The method of claim 1, wherein:
receiving the UL signal or channel further comprises receiving the UL signal or channel based on a spatial domain filter having an index, and
the first information provides the index of the spatial domain filter from a set of spatial domain filters for the access link of the NCR-Fwd entity.

9. A network-controlled repeater (NCR) comprising:
a transceiver of an NCR mobile termination (NCR-MT) entity configured to receive:
first information for reception parameters of a set of uplink (UL) signals or channels, and
second information for reporting a metric corresponding to the set of UL signals or channels;
a transceiver of an NCR forwarding (NCR-Fwd) entity configured to receive, on an access link and based on the first information, an UL signal or channel from the set of UL signals or channels; and
a processor of the NCR-MT entity, operably coupled to the transceiver of the NCR-MT entity and the transceiver of the NCR-Fwd entity, the processor of the NCR-MT entity configured to determine:
a measurement for the UL signal or channel, and
a value for the metric based on the measurement,
wherein the transceiver of the NCR-MT entity is further configured to transmit a physical uplink shared channel (PUSCH) or a physical uplink control channel (PUCCH) that provides the value.

10. The NCR of claim 9, wherein:
the UL signal or channel is a sounding reference signal (SRS),
the metric is an SRS reference signal received power (SRS-RSRP),
the value is an index for an RSRP range, from a set of RSRP ranges, that includes the SRS-RSRP, and
the set of RSRP ranges is predetermined or provided by higher layers.

11. The NCR of claim 9, wherein:
the UL signal or channel is a physical random access channel (PRACH),
the metric is an energy per resource element (EPRE),
the value is an index for an EPRE range, from a set of EPRE ranges, that includes the EPRE for the PRACH, and
the set of EPRE ranges is predetermined or provided by higher layers.

12. The NCR of claim 9, wherein:
the UL signal or channel is a sounding reference signal (SRS) or a physical random access channel (PRACH),
the metric is a relative time of arrival (RTOA) for the SRS or the PRACH, and
the RTOA is an offset between a slot or symbol for reception, by the NCR-Fwd entity, of the SRS or the PRACH and a slot or symbol for one of:
reception, by the NCR-MT entity, of a synchronization signal block (SSB) or a channel state information reference signal (CSI-RS) associated with the SRS or the PRACH,
transmission of the SSB or CSI-RS, or
transmission of the SRS or the PRACH.

13. The NCR of claim 9, wherein:
the UL signal or channel is a physical random access channel (PRACH), and
the metric is a timing alignment (TA).

14. The NCR of claim 9, wherein:
the transceiver of the NCR-MT entity is further configured to receive a downlink control information (DCI) format or a medium access control control-element (MAC CE) that indicates:
an identity (ID) of the UL signal or channel,
to receive the UL signal or channel, and
to determine the measurement of the UL signal or channel.

15. The NCR of claim 9, wherein:
the UL signal or channel is a physical random access channel (PRACH), and
the PUSCH or the PUCCH further provides one or more of:
a random access channel (RACH) occasion,
a synchronization signal block (SSB) index, or
a PRACH preamble index
associated with the PRACH.

16. The NCR of claim 9, wherein:
the transceiver of the NCR-Fwd entity is further configured to receive the UL signal or channel based on a spatial domain filter having an index, and
the first information provides the index of the spatial domain filter from a set of spatial domain filters for the access link of the NCR-Fwd entity.

17. A base station comprising:
a transceiver configured to:
transmit, to a network-controlled repeater (NCR), first information for reception parameters of a set of uplink (UL) signals or channels,
transmit, to the NCR, second information for reporting a metric corresponding to the set of UL signals or channels; and
receive, from the NCR, a physical uplink shared channel (PUSCH) or a physical uplink control channel (PUCCH) that provides a value for the metric that is associated with an UL signal or channel, from the set of UL signals or channels.

18. The base station of claim 17, wherein:
the UL signal or channel is a sounding reference signal (SRS),
the metric is an SRS reference signal received power (SRS-RSRP),
the value is an index for an RSRP range, from a set of RSRP ranges, that includes the SRS-RSRP, and
the set of RSRP ranges is predetermined or provided by higher layers.

19. The base station of claim 17, wherein:
the UL signal or channel is a physical random access channel (PRACH), and
the metric is a timing alignment (TA).

20. The base station of claim 17, wherein:
the transceiver is further configured to transmit, to the NCR, a downlink control information (DCI) format or a medium access control control-element (MAC CE) that indicates:
an identity (ID) of the UL signal or channel,
to receive the UL signal or channel, and
to measure the UL signal or channel.

* * * * *